US006886998B2

United States Patent
Kasuu et al.

(10) Patent No.: US 6,886,998 B2
(45) Date of Patent: May 3, 2005

(54) METHOD FOR FUSION SPLICING OPTICAL FIBERS AND APPARATUS FOR HEATING SPLICED PART BY ARC

(75) Inventors: Osamu Kasuu, Yokohama (JP);
Motonori Nakamura, Yokohama (JP);
Tomomi Sano, Yokohama (JP);
Tomomi Moriya, Yokohama (JP);
Shinji Kayou, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 169 days.

(21) Appl. No.: 10/150,929

(22) Filed: May 21, 2002

(65) Prior Publication Data

US 2002/0176673 A1 Nov. 28, 2002

(30) Foreign Application Priority Data

May 22, 2001 (JP) ...................................... 2001-152766
Sep. 20, 2001 (JP) ...................................... 2001-287472

(51) Int. Cl.⁷ ............................................ G02B 6/255
(52) U.S. Cl. ............................ 385/96; 385/95; 385/97; 385/98
(58) Field of Search ............................... 385/96, 97–95, 385/98, 99; 215/130.01, 130.33, 130.4, 130.51; 219/124.34, 137

(56) References Cited

U.S. PATENT DOCUMENTS

| 4,329,560 A | | 5/1982 | Tanuma | |
|---|---|---|---|---|
| 4,435,632 A | * | 3/1984 | Risberg | 219/130.51 |
| 4,810,054 A | * | 3/1989 | Shinbori et al. | 385/96 |
| 4,957,343 A | * | 9/1990 | Sato et al. | 385/96 |
| 4,958,905 A | * | 9/1990 | Tynes et al. | 385/96 |

(Continued)

FOREIGN PATENT DOCUMENTS

| DE | 196 43 661 A1 | 4/1998 |
|---|---|---|
| EP | 0 895 103 A1 | 2/1999 |
| EP | 1 235 085 A2 | 8/2002 |
| JP | 5-333227 | 12/1993 |
| JP | 2000-98171 A | 4/2000 |
| JP | P3119822 | 10/2000 |
| JP | P2001-166175 A | 6/2001 |

OTHER PUBLICATIONS

K. Ohzawa, S. Yaguchi, J. Suzuki, N. Kawanishi, and S. Saito, "Development of New Optical Fiber Fusion Splicer for Factory Use," *International Wire & Cable Symposium Proceedings*, 1999, pp. 644–649.

*Primary Examiner*—John R. Lee
*Assistant Examiner*—David A. Vanore
(74) *Attorney, Agent, or Firm*—McDermott Will & Emery LLP (57) ABSTRACT

An object is to provide an optical fiber fusion splicing method in which splice loss can be reduced, and also to provide an arc-heating unit used for heating the fusion spliced part of an optical fiber. The method comprises a process of fusion-splicing together the end faces of two optical fibers and a process of continuously heating the fusion spliced part by arc while moving one pair of electrodes provided opposite to each other across the fusion spliced part. The arc heating process is performed with the operation for decreasing arc temperature. The operation for decreasing arc temperature may be achieved by flowing a gas having a molecular weight greater than the average molecular weight of air into a gas atmosphere in which arc heating is performed, or by adding a modulation to an electric discharge current such that the maximum value becomes equal to or more than an electric current for starting arc discharge and the minimum value becomes more than zero and less than the electric current for starting arc discharge.

6 Claims, 6 Drawing Sheets

U.S. PATENT DOCUMENTS

| | | | | |
|---|---|---|---|---|
| 5,018,824 A | * | 5/1991 | Ooe et al. | 385/99 |
| 5,046,812 A | * | 9/1991 | Yanagi et al. | 385/96 |
| 5,161,207 A | * | 11/1992 | Pikulski | 385/96 |
| 5,222,171 A | * | 6/1993 | Straus | 385/96 |
| 5,223,014 A | * | 6/1993 | Yamauchi et al. | 65/408 |
| 5,243,674 A | * | 9/1993 | Chandross et al. | 385/96 |
| 5,288,301 A | | 2/1994 | Rowe et al. | |
| 5,384,878 A | * | 1/1995 | Osaka et al. | 385/96 |
| 5,414,788 A | * | 5/1995 | Kammlott et al. | 385/96 |
| 5,551,968 A | * | 9/1996 | Pan | 65/387 |
| 5,581,646 A | * | 12/1996 | Tsukamoto et al. | 385/96 |
| 5,588,082 A | * | 12/1996 | Whitesmith | 385/96 |
| 5,596,672 A | * | 1/1997 | Harman et al. | 385/147 |
| 5,638,476 A | * | 6/1997 | Zheng | 385/96 |
| 5,658,966 A | * | 8/1997 | Tsukamoto et al. | 522/99 |
| 5,777,867 A | | 7/1998 | Hongu et al. | |
| 5,861,444 A | * | 1/1999 | Tsukamoto et al. | 522/99 |
| 6,062,743 A | * | 5/2000 | Zheng et al. | 385/95 |
| 6,230,522 B1 | * | 5/2001 | Ruegenberg | 65/377 |
| 6,336,750 B1 | * | 1/2002 | Clark et al. | 385/96 |
| 6,550,985 B2 | * | 4/2003 | Nakamura et al. | 385/96 |
| 6,652,163 B2 | * | 11/2003 | Fajardo et al. | 385/96 |
| 2002/0157424 A1 | | 10/2002 | Kasuu et al. | |

* cited by examiner

METHOD FOR FUSION SPLICING OPTICAL FIBERS AND APPARATUS FOR HEATING SPLICED PART BY ARC

BACKGROUND OF THE INVENTION

1. Field of the Invention

The present invention relates to a method for fusion splicing together the end faces of two optical fibers and an apparatus for heating the spliced part by arc.

2. Description of the Background Art

For connecting two lengths of optical fibers, there are methods such as a fusion splicing method and a method in which an optical connector is used.

In the fusion splicing method, the end faces of two lengths of optical fibers are subjected to pre-fusion heating and they are butted together and further heated so as to be fusion spliced together. The characteristic of fusion splicing is that the splice loss is small compared with using an optical connector for connection.

The splice loss increases, however, if the mode field diameters of the two optical fibers to be fusion-spliced are different. Therefore, in order to solve such problem heat treatment is applied to the vicinity of the fusion spliced part after fusion splicing so as to cause the element added in this part to diffuse such that the mode field diameter changes continuously in the fusion spliced part, thereby reducing the splice loss. This treatment is called Thermally-diffused Expanded Core (TEC) treatment. In the TEC treatment, arc is used, among several available means such as, micro torch, electric heater, and arc, in view of the advantage that arc can be used also for fusion splicing in the same equipment.

The present inventors found that in a case where arc was used, the variation of the mode field diameter in the longitudinal direction of fiber did not become sufficiently smooth, since the heating width of arc was small. Therefore, the present inventors devised an optical fiber fusion splicing method in which after fusion-splicing two optical fibers, the fusion spliced part was subjected to heat treatment by arc with one pair of electrodes which were provided opposite to each other across the fusion spliced part and which were moved at least in the longitudinal direction of the fiber.

However, the present inventors further found that in the fusion splicing method, at a turn-back point of the arc electrodes, the fiber tended to be heated beyond a necessary level and the variation in the mode field diameter in the longitudinal direction of fiber did not become smooth, thereby causing the radiative loss to increase at the turn-back portion and the effect of splice loss reduction to be decreased accordingly.

There have been cases in which because of a limit to freedom in the temperature control, the portions other than such turn-back points were also over-heated occasionally, causing the radiative loss to increase in such portions and consequently the effect of the splice loss reduction to be decreased. Moreover, the thermal distortion tended to occur in the vicinity of the fusion-spliced part, causing the strength of the fusion-spliced part to deteriorate.

As for the method of lowering arc temperature, there is a method, such as disclosed in K. Ohzawa et al.: International Wire & Cable Symposium Proceedings (1999) pp. 644–649, in which arc discharge is performed intermittently. Generally, in a fusion splicing apparatus, a high voltage of tens-of kV, which is needed for performing arc discharge, is obtained using a step-up transformer. In the case of intermittent arc discharge, however, it is difficult to control arc temperature, since the electric discharge current becomes unstable because the transformer must boost the voltage repeatedly in order for arc to be generated. As a result, the effect of the splice loss reduction is not sufficient. In the above-mentioned proceedings, the effect of the splice loss reduction is about 30%. Also, the TEC treatment becomes complicated in the case of stabilizing electric discharge current.

SUMMARY OF THE INVENTION

An object of the present invention is to provide an optical fiber fusion splicing method in which splice loss can be reduced, and also to provide an arc-heating unit used for heating the fusion spliced part of an optical fiber.

In order to achieve this object, the optical fiber fusion splicing method comprises a process of fusion-splicing together the end faces of two optical fibers and a process of continuously heating the fusion spliced part by arc while moving one pair of electrodes, which are provided opposite to each other across the fusion spliced part, at least in a longitudinal direction of the fiber.

In one embodiment, the operation for decreasing arc temperature may be achieved by flowing a gas having a molecular weight greater than the average molecular weight of air into a gas atmosphere in which arc heating is performed. In this case, preferably argon gas is used as such gas. Also, it is preferable to set the flow rate of argon gas in the range of 200–800 ml/min.

In another embodiment, the operation for decreasing arc temperature may be to add a modulation to the electric discharge current such that the maximum value becomes equal to or more than an electric current for starting arc discharge and the minimum value becomes more than zero and less than the electric current for starting arc discharge.

Here, the electric current for starting arc discharge is the minimum value of the electric discharge current that flows at the time when the dielectric breakdown occurs between one pair of electrodes. In this case, the modulation may be achieved by a square wave whose frequency is in the range of 10 Hz–20 MHz. The modulation may be performed with a square wave whose duty ratio is in the range of 1%–90%. Also, these two embodiments may be implemented in combination.

An arc heating unit of the present invention for heating a fusion spliced part of two optical fibers can continuously heat the fusion spliced part by arc while moving at least in a longitudinal direction of fiber one pair of electrodes provided opposite to each other across the fusion spliced part of the optical fiber. Arc heating can be performed by the arc-heating unit in combination with an operation for decreasing the arc temperature.

In one embodiment, the operation for decreasing arc temperature may be to add a modulation to an electric discharge current such that the maximum value becomes equal to or more than an electric current for starting arc discharge and the minimum value becomes more than zero and less than the electric current for starting arc discharge.

The present invention is further explained below by referring to the accompanying drawings. The drawings are provided solely for the purpose of illustration and are not intended to limit the scope of the invention.

DETAILED DESCRIPTION OF THE INVENTION

Embodiments of the present invention are explained below by referring to the accompanying drawings. In the drawings, the same number bears the same sign to avoid duplicate explanation. The ratios of the dimensions in the drawings do not necessarily coincide with the explanation.

Figure 1:
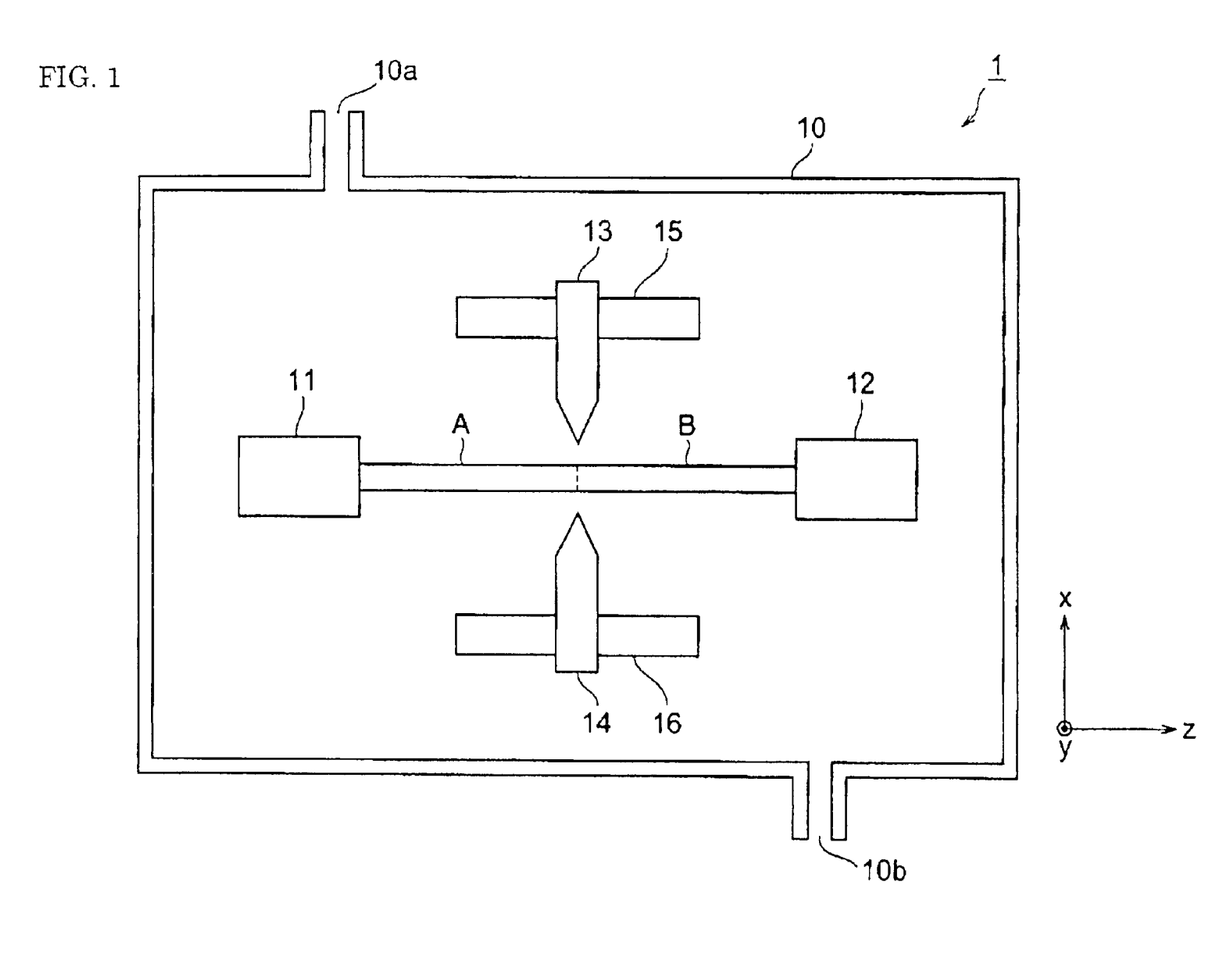
FIG. 1 is a diagram of an optical fiber fusion splicing apparatus.

First, an explanation is given about an optical fiber fusion splicing apparatus with which the optical fiber fusion splicing method of the present invention is implemented. FIG. 1 is a diagram of an optical fiber fusion splicing apparatus 1 including an arc heating unit of the present invention for the optical fiber fusion spliced part.

The optical fiber fusion splicing apparatus 1 comprises a holding part 11 for holding an optical fiber A on one side, a holding part 12 for holding an optical fiber B on the other side, one pair of electrodes 13 and 14, an electrode carrier 15 for moving the electrode 13, and an electrode carrier 16 for moving the electrode 14, all of which are provided in a housing 10. Also, the housing 10 has a gas supply inlet 10a for supplying thereinto argon (Ar) gas (molecular weight 39.95) as a gas whose molecular weight is greater than the average molecular weight (29.0) of air, and a gas exhaust outlet 10b for discharging inner gas to outside. Here, for the purpose of explanation, a rectangular coordinate system (X, Y, and Z) is assumed as shown in FIG. 1. Axis Z is parallel to the optical axis of each of the optical fibers A and B. Axis X is parallel to the surface of the paper including FIG. 1 and perpendicular to the optical axis of each of the optical fibers A and B. Axis Y is perpendicular to the surface of the paper and to the optical axis of each of the optical fibers A and B.

Figure 6:
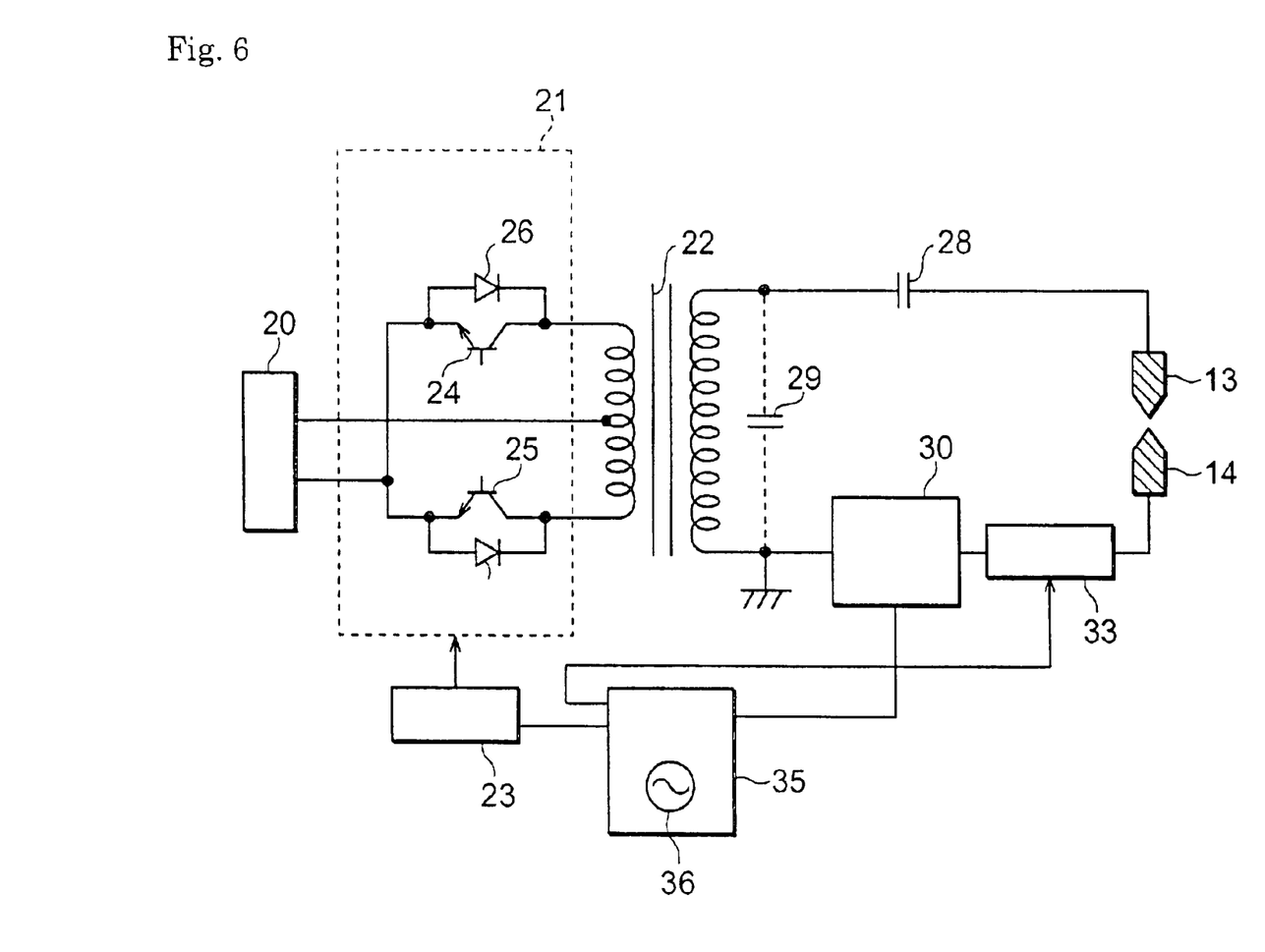
FIG. 6 is a block diagram showing the composition of an electric discharge current control circuit.

Next, the composition of an electric discharge current control circuit contained in the arc-heating unit is explained in reference to FIG. 6. The electric discharge current control circuit has a power supply 20, a switching part 21, a transformer 22, an oscillation part 23, an electric current detecting part 30, a resistance part 33, and a control unit 35.

The oscillation part 23 that is controlled by the control unit 35 generates pulse signals. The pulse signals are input to the base terminals of switching transistors 24 and 25 in the switching part 21 alternately. When the switching transistor 24 turns an electric current on according to the pulse signal at one part of the primary winding divided by the center tap, the switching transistor 25 turns off an electric current to the other one part.

The on-off operations are repeated according to the pulse signals output from the oscillation part 23, and consequently, AC voltage is supplied to the primary side of the transformer 22. This AC voltage is boosted by the transformer 22. The boosted AC voltage is supplied to the electrodes 13 and 14 through a condenser 28. Also, a capacitance element 29 is achieved at the floating capacity of the transformer 22.

The electric current detecting part 30, which is inserted between the grounded terminal of the secondary side terminals of the transformer 22 and the electrode 14 (the electrode on the side in which the condenser 28 is not connected), detects the electric current which flows through the electrodes 13 and 14. The resistance part 33 is inserted between the electric current detecting part 30 and the electrode 14.

The control unit 35 has a signal generator 36 for generating modulating voltage. The modulating voltage generated by the signal generator 36 is output into the oscillation part 23 and the resistance part 33. The signal generator 36 controls electric discharge current by the adjustment of impedance in the resistance part 33 according to the electric discharge current detected at the electric current detecting part 30. At the same time, it adds to the oscillation part the modulating voltage as a variable resistance for electric current adjustment. Thus, the control unit 35 (the signal generator 36) controls the frequency or pulse width of the drive pulse of pulse width modulation type that is output from the oscillation part 23 and the resistance value of the resistance part 33 so as to generate an electric discharge current having desired values, that is, two steps of electric discharge currents: an electric discharge current having a value equal to or more than the electric current for starting arc discharge and an electric discharge current having a value that is more than zero and that is less than the electric current for starting arc discharge.

Figure 2:
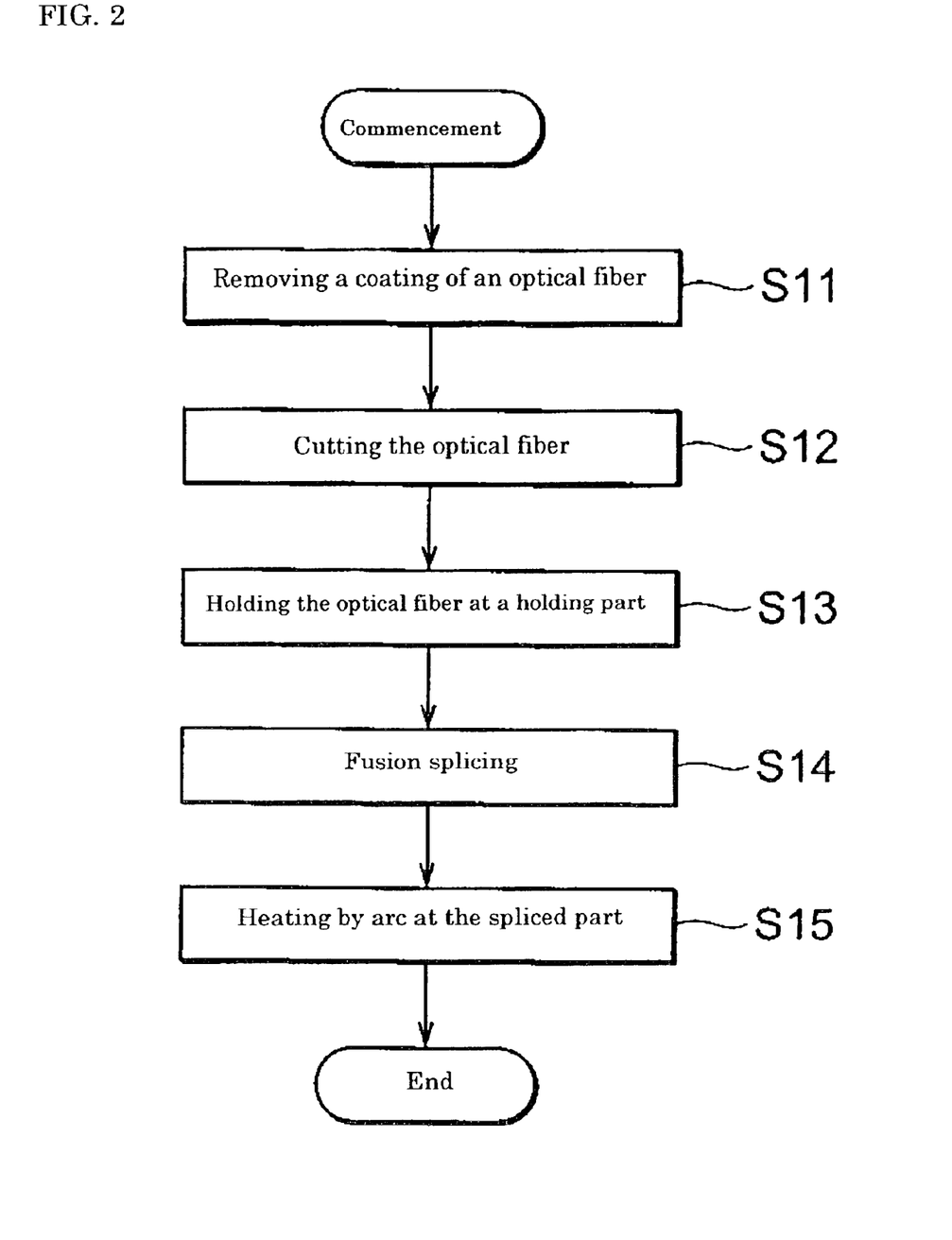
FIG. 2 is a flow chart showing an example of the optical fiber fusion splicing method of the present invention.

Next, an explanation is given based on FIG. 2 about the optical fiber fusion splicing method which uses the above-mentioned optical fiber fusion splicing apparatus 1. FIG. 2 is a flow chart explaining the optical fiber fusion splicing method according to the present embodiment.

First, a part of each coating of optical fibers A and B is removed (Step S11), and the tip of the part of the fiber where coating is removed is mirror-cut (Step S12). Then, the optical fiber A is held at holding part 11 and the optical fiber B is held at the holding part 12 (Step S13). At this time, the optical fiber A and B are arranged in a manner in which their mirror-cut end faces are placed opposite to each other, and their positions are adjusted so that their optical axes coincide.

Subsequently, the optical fibers A and B are fusion-spliced (Step S14). At this time, the vicinity of the end faces of optical fibers A and B are melted by arc heating with one pair of electrodes 13 and 14, and the end faces are pushed to each other by holding parts 11 and 12 so as to be fusion-spliced. Thus, the optical fibers A and B are fusion-spliced.

Subsequently, the fusion-spliced part is heated by arc (Step S15: arc-heating process). At this time, modulation is added to the electric discharge current such that the maximum value becomes equal to or more than the electric current for starting arc discharge and the minimum value becomes the value which is more than zero and less than the electric current for starting arc discharge. Also, argon gas is supplied into the housing 10 from the gas supply inlet 10a so that the inside of the housing 10 becomes an argon gas atmosphere. Then, one pair of electrodes 13 and 14 heats the fusion spliced part by arc while they are moved by electrode carriers 15 and 16 at least in a direction which is parallel to the Z-axis. The electrodes 13 and 14 may also be moved by the electrode carriers 15 and 16 in a direction parallel to the Y-axis. In this case, it is possible to determine the pattern of movement (heating time at each position) of the electrodes 13 and 14, and the electric current (heating power) to be supplied to the electrodes 13 and 14, based on a predetermined diffusion coefficient of each added element of the optical fibers A and B.

Preferably, the above-mentioned modulation in the arc heating process is performed by means of a square wave having a frequency in the range of 10 Hz–20 MHz. This makes it possible to easily modulate an electric discharge current so as to have the maximum value equal to or more than the electric current for starting arc discharge and the minimum value which is more than zero and less than the electric current for starting arc discharge.

Also, it is preferable to perform modulation in the above-mentioned arc heating process by a square wave and to set the duty ratio of the square wave in the range of 1%–90%. Setting the duty ratio of the square wave to less than 1% causes the electric discharge current to remain small, which may generate unstable arc or may result in failure to generate arc. Setting the duty ratio of the square wave to more than 90% causes the arc temperature to become excessively high. Therefore, by setting the duty ratio of the square wave in the range of 1%–90% it is possible to achieve a more stable arc and to secure appropriate arc temperature. Here, the duty ratio is expressed by a formula: H/(L+H)×100(%), where H is time in which the electric discharge current is equal to or more than the electric current for starting arc discharge, and L is time in which the electric discharge current is more than zero and less than the electric current for starting arc discharge.

In the optical fiber fusion splicing apparatus 1, one pair of the electrodes 13 and 14 is used in both the fusion splicing process and the arc heating process. However, different electrodes may be used for the fusion splicing process and the arc heating process, respectively. When the same electrodes are used in both the fusion splicing process and the arc heating process, the electric discharge current must be controlled such that the electric discharge current in the arc heating process is set to a low value as compared with the case of the fusion splicing process, for example, about a level of trigger electric current that causes dielectric breakdown. If arc heating is performed by an electric discharge current for performing fusion splicing, the heating temperature of the optical fibers A and B becomes excessively high because of over intensive arc power.

In the optical fiber fusion splicing method according to the present embodiment, arc heating is performed in Step S15 with one pair of electrodes 13 and 14 in an argon gas atmosphere. However, other gases other than argon may be used, for example, $CO_2$ (molecular weight 44.01) or $O_2$ (molecular weight 32.0) and so on, provided that the gas has a molecular weight which is greater than the average molecular weight of air, and does not have an adverse effect on the optical fiber glass. Thus, it is possible to reduce the temperature caused by arc and level off the temperature distribution of an optical fiber in the longitudinal direction in the vicinity of the fusion spliced part. The reason for this is likely due to the decrease of the velocity of molecular movement in the plasma caused by arc discharge when arc discharge is performed in a gas atmosphere whose molecular weight is greater than the average molecular weight of air as compared with the case in which arc discharge is performed in air. As a result, the mode field diameter distribution can be made smoother in the longitudinal direction of fiber, allowing the splice loss to become significantly small.

Also, in the arc heating process (Step S15), the fusion spliced part is heated at a lower temperature than at the time of the fusion splicing, since the temperature due to arc is reduced. Accordingly, the thermal distortion caused at the fusion-spliced part at the time of fusion splicing can be removed, and the breaking strength of the fusion-spliced part can be improved.

Also, in the present embodiment, the arc temperature is decreased since modulation can be applied to the electric discharge current in the arc heating process (Step S15) such that the maximum value becomes equal to or more than the electric current for starting arc discharge and the minimum value becomes more than zero and less than the electric current for starting arc discharge. Therefore, the fusion spliced part is not heated beyond a level of necessity, and the variation of mode field diameter in the fusion spliced part can be smoothed, which can reduce the splicing loss substantially. Also, the thermal distortion near the fusion spliced part can be eliminated, which can prevent the deterioration of strength at the fusion spliced part.

Also, the arc temperature can be suitably controlled since the minimum value of the electric discharge current becomes more than zero and less than the electric current for starting arc discharge, allowing the electric discharge current to be stable. As a result, it is possible to restrain the effect of the decrease of splice loss reduction. Also, the stabilization of the electric discharge current can be achieved with a simple composition because it is unnecessary to provide the mechanism for compensating arc power.

Figure 3:
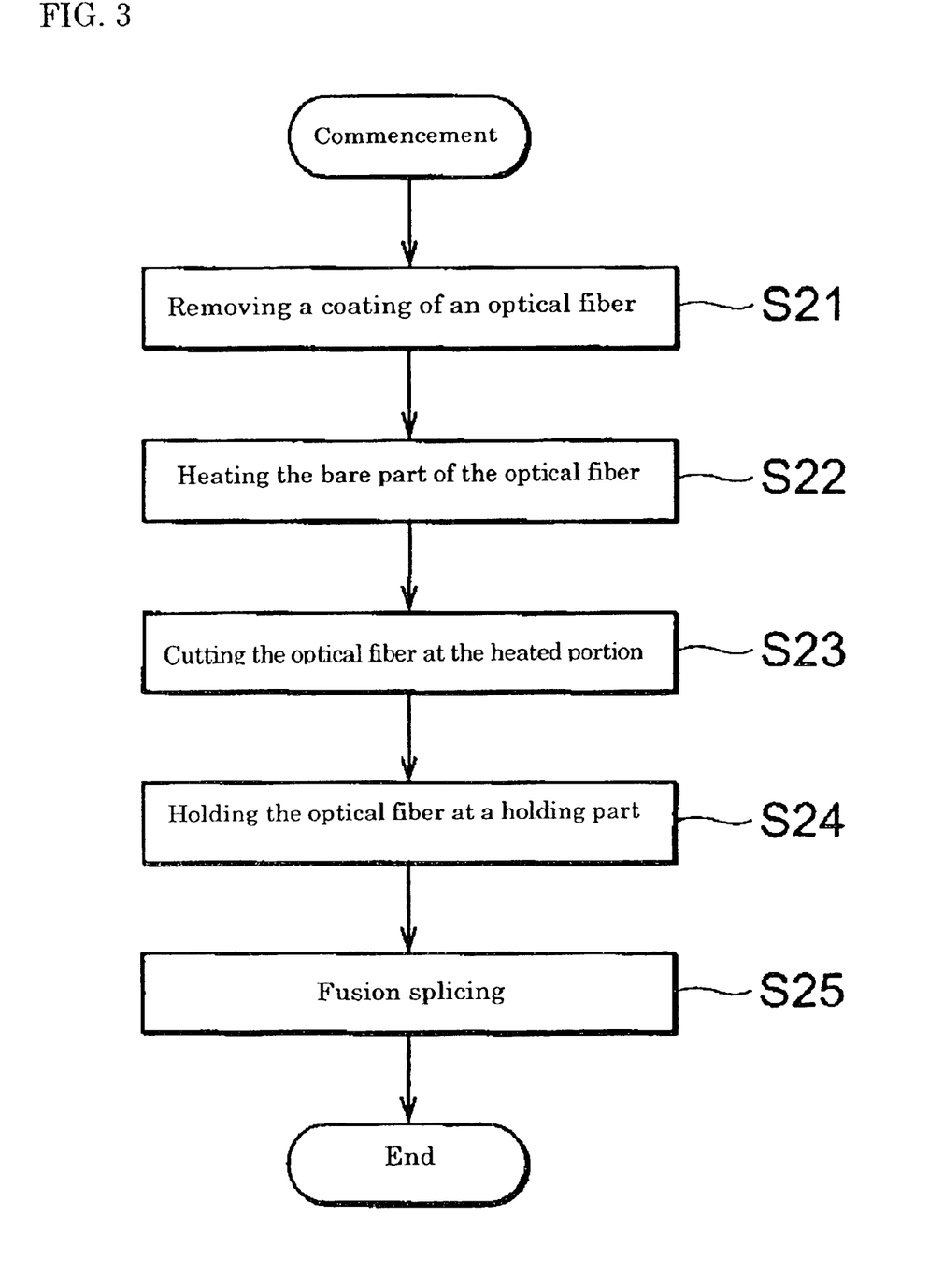
FIG. 3 is a flow chart showing another example of the optical fiber fusion splicing method of the present invention.

As shown in FIG. 3, an arc heating process may be provided before a fusion splicing process, despite the arc heating process being provided after the fusion splicing process in the above explanation. FIG. 3 is a flow chart explaining an optical fiber fusion splicing method according to another embodiment.

In the optical fiber fusion splicing method shown in FIG. 3, the coating of each of the optical fibers A and B is removed (Step S21), and then the part to become the fusion spliced part upon fusion splicing of each of the optical fibers A and B is heated by arc (Step S22: arc heating process). In this case, arc heating is also performed with one pair of the electrodes 13 and 14, which is moved, in an argon gas atmosphere. In this case, it is possible to determine the pattern of the movement (heating time in each position) of one pair of the electrodes 13 and 14 and the electric current (heating amount) to be supplied to one pair of the electrodes 13 and 14, based on a predetermined diffusion coefficient of the added element of the optical fibers A and B.

After the arc heating, each of the optical fibers A and B is mirror-cut at the heated part where the coating has been removed (Step S23). Then, the optical fiber A is held at the holding part 11, and the optical fiber B is held at the holding part 12 (Step S24), and the optical fibers A and B are fusion-spliced (Step S25: fusion splicing process). After that, the fusion spliced part may be heated at low temperature so as to remove the thermal distortion of the fusion spliced part while moving one pair of the electrodes 13 and 14 in a direction of either the Y-axis or the Z-axis.

In this way, also, the temperature by arc in the arc heating process is reduced, and the temperature distribution of each of the optical fibers A and B can be leveled off in the longitudinal direction at the vicinity of the part to be fusion-spliced. Consequently, this allows the mode field diameter distribution of the fiber in the longitudinal direction to be made smoother and the splice loss to be made significantly small.

In FIG. 6, controlling unit 35 functions as a means for modulating the output of the arc discharge unit. In FIG. 6, reference character 20 denotes a power supply, reference numeral 23 denotes an oscillation part; reference numeral 30 denotes an electric current detecting part and reference numeral 33 denotes a resistance part.

Several kinds of experiments were performed with respect to the optical fiber fusion splicing method of the present invention in order to confirm the effect of the splice loss reduction obtained by performing arc heating of the fusion spliced part by one pair of the electrodes in a gas atmosphere whose molecular weight is greater than the average molecular weight of air. In these experiments, the optical fiber fusion splicing apparatus 1 having the above-mentioned composition was used, and the interval between one pair of the electrodes 13 and 14 was set to 3 mm. The flow rate of argon gas was controlled with a mass flow controller. A pure silica core optical fiber having a mode field diameter of 12 µm, which is greater than a usual single mode fiber, was used as the optical fiber A, and a dispersion compensating fiber having a mode field diameter of 5 µm or less was used as the optical fiber B.

The experiment was conducted in a manner in which the control of electric discharge current was performed using a resistance device and the electric discharge current was controlled in the range of 13–35 mA. The electric discharge current was measured using an electric current probe (P6021 type by Sony Tektronix Corp.) for an electrode on the low-tension side. The reliability of the electric discharge current was evaluated as a preliminary experiment. The results of the preliminary experiment confirmed that although it was impossible to completely suppress the leak electric current flowing through the insulator surface, the leak electric current was suppressed to a small stable current, that is, the minimum value of the electric discharge current was 13.0±0.02 mA and the maximum electric current was 33.3±0.041 mA. The splice loss was measured by inputting light of a 1.5 µm wavelength to one end of the optical fiber on the side where the mode field diameter was larger and using a power meter connected to the other end of the fiber.

An evaluation of the occurrence of the diffusion of the added element can be made by measuring a mode field diameter at each end face cut after heating each of the optical fibers A and B by arc. In other words, the variation of the mode field diameter can be examined by repeating the measurement of the mode field diameter while polishing 0.1 mm each time at the end portion of the optical fiber including the measured part to which a connector is attached. It is also possible to confirm the diffusion of the added elements by examining the distribution of the elements directly, using an electron probe micro analyzer before and after arc heating, at the cut end face of each of the optical fibers A and B.

First, an experiment was conducted to confirm the effect of an arc temperature reduction by argon gas. Arc discharge was performed while the flow rate of argon gas was changed in the range of 0–1000 ml/min. The electric discharge current was 13.1 mA, which was a minimum electric current.

It was confirmed by visual observation that the beam width of the arc expanded in the case of 200–800 ml/min. as compared with the case of 0 ml/min., which corresponds to air. Also, it was confirmed that no arc discharge occurred at 1000 ml/min. or more. Moreover, the electric discharge current was confirmed to be nearly constant regardless of the flow rate of argon gas.

Figure 4:
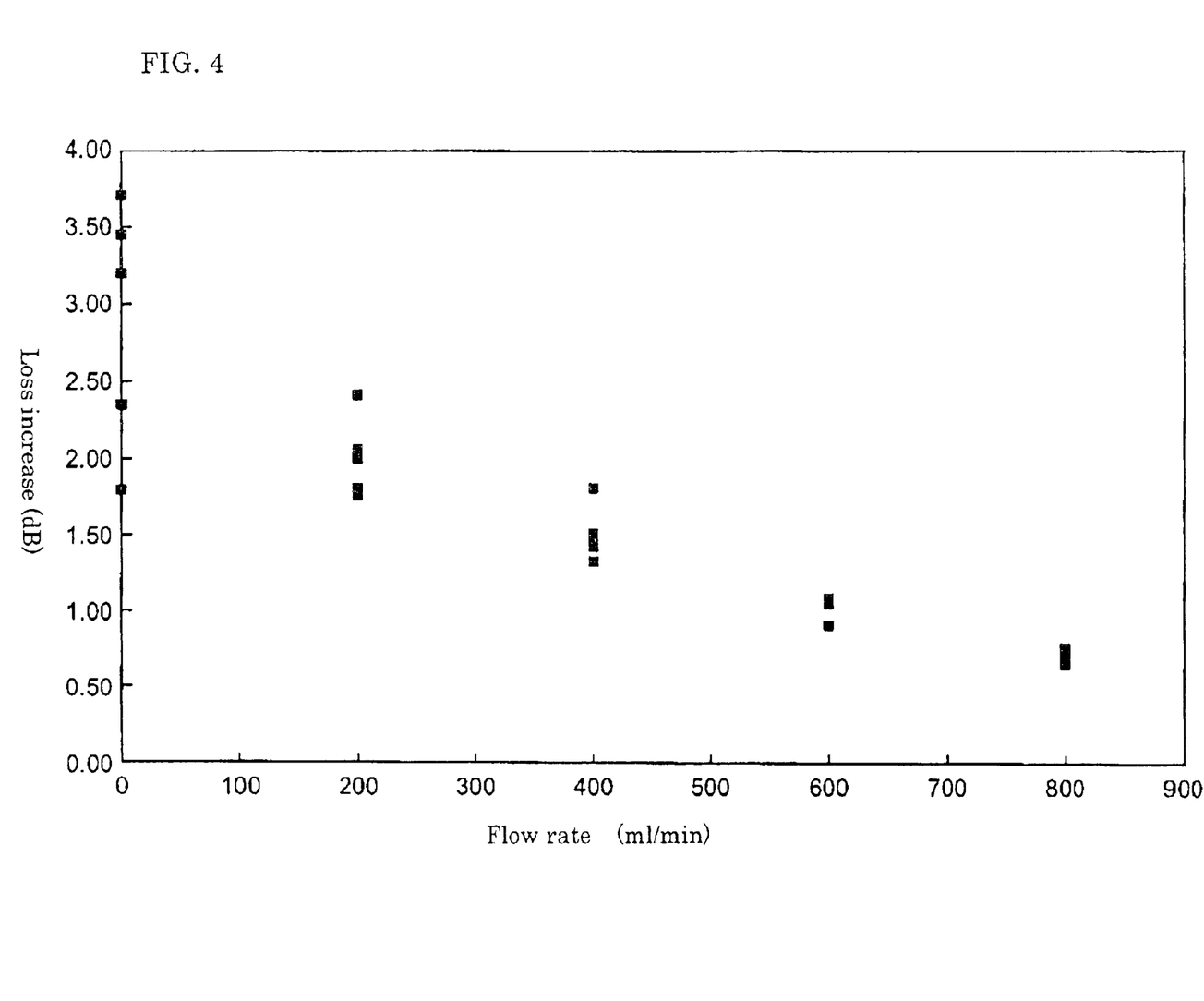
FIG. 4 is a graph showing the relationship between the flow rate of argon gas and the loss increase.

Subsequently, an experiment was performed to confirm the variation in the loss increase of the optical fiber B with respect to arc discharge in which the flow rate of argon gas was changed. The fiber used in the experiment was the optical fiber B that easily increases the mode field diameter when it is heated, and hence the loss tends to increase. The experiment was conducted in a manner wherein arc heating was performed in a state in which 10 plus several mm of the coating of the optical fiber B was removed and such removed part was held at the holding part 12 so as to be positioned at the center between the holding parts 11 and 12. At this time, arc heating was conducted in the range of 5 mm in a direction parallel to the Z-axis while the stroke speed of one pair of the electrodes 13 and 14 in a direction parallel to the Z-axis was altered in the range of 250–2000 µm/s. The results are shown in FIG. 4. As can be seen from FIG. 4, the loss increase is reduced with the increase of the flow rate of argon gas.

Figure 5:
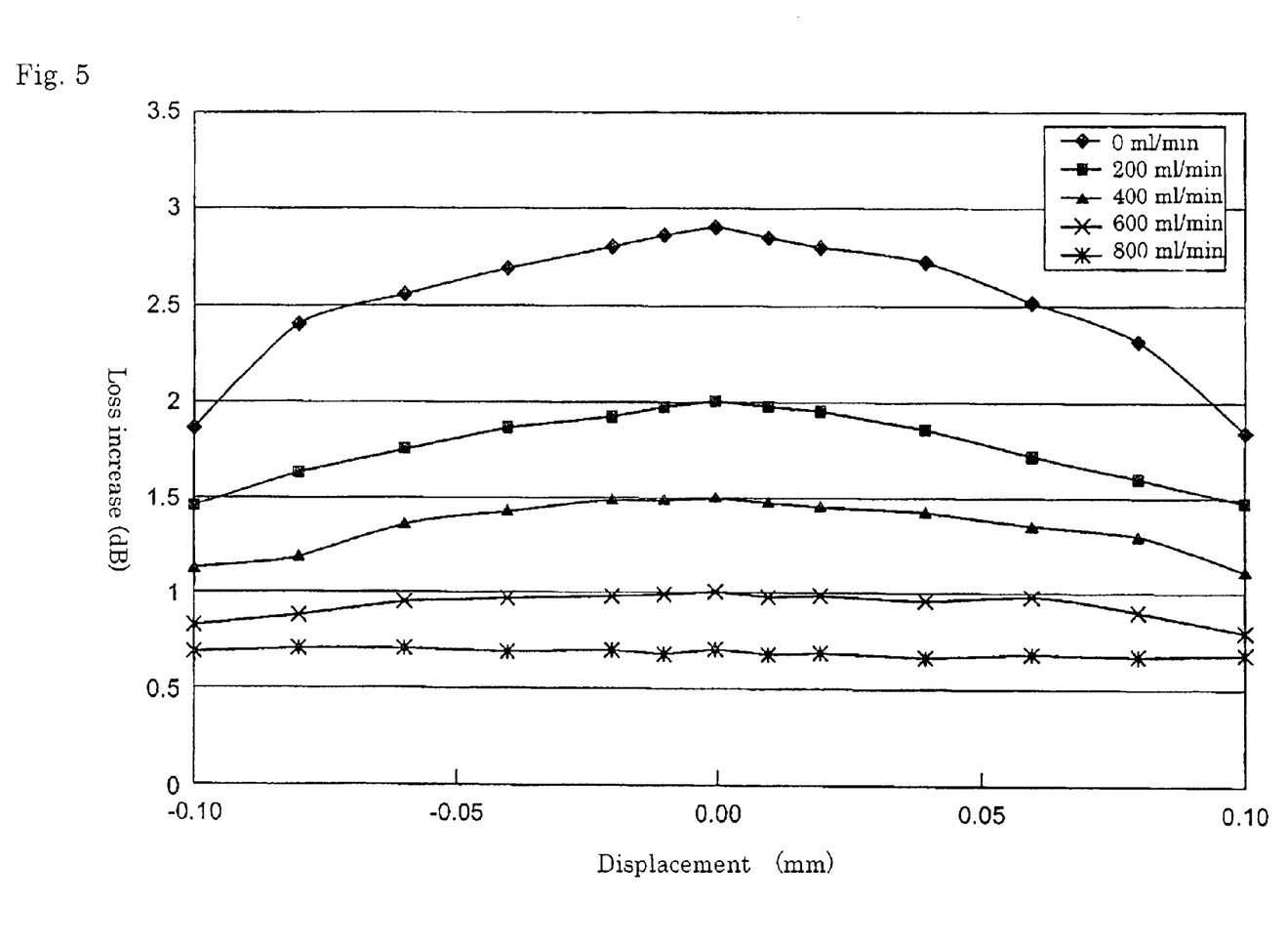
FIG. 5 is a graph showing the relationship between the displacement of the electrodes and the optical fiber in an Y-axis direction and the loss increase.

Next, an experiment was performed by shifting the position of the central axis of one pair of the electrodes 13 and 14 in the Y-axis direction to confirm the variation in the loss increase on the assumption that the variation in the loss increase shown in FIG. 4 was caused by the displacement of an arc beam and the optical fiber B in the Y-axis direction. Such assumption was made based on the occasional occurrence of the displacement of the arc position due to dirt of one pair of the electrodes 13 and 14 in a direction parallel to the Y-axis when arc discharge was done a plurality of times. Arc heating was performed while the position of one pair of the electrodes 13 and 14 was shifted in the range of ±0.1 mm in a direction parallel to the Y-axis relative to the position of the electrodes that was set as 0 when the position of one pair of electrodes 13 and 14 was at the same height as the optical fiber B. The results are shown in FIG. 5. As can be seen from FIG. 5, the variation in the loss increase due to the displacement of the optical fiber B and one pair of the electrodes 13 and 14 in the Y-axis direction decreases as the flow rate of argon gas increases in the cases where the flow rate of argon gas was in the range of 200–800 ml/min.

In the following, an explanation is given about the results of the experiments conducted with respect to Examples 1 and 2 according to the present invention, and Comparative Examples 1 and 2, which were made for the purpose of comparison with the examples of the present invention.

In these experiments, the optical fiber fusion splicing apparatus 1 was used, and the interval between the electrodes 13 and 14 was set to 3 mm. Also, a pure silica core optical fiber having a mode field diameter of 12 µm, which was larger compared with a usual single mode fiber, was used as optical fiber A, and a dispersion compensating fiber having a mode field diameter of 5 µm or less was used as optical fiber B.

EXAMPLE 1

The optical fibers A and B were fusion-spliced, and arc heating was performed in an argon gas atmosphere. The electric discharge current was set to 13.1 mA, which was a minimum electric current. Arc heating was performed in the range of ±5 mm of the fusion-spliced point of the optical fibers A and B in the Z-axis direction. The flow rate of argon gas in this case was 500 ml/min. The splice loss measured after fusion splicing was 1.35±0.02 dB. On the other hand, the splice loss measured after arc heating was 0.2±0.05 dB.

COMPARATIVE EXAMPLE 1

The optical fibers A and B were fusion-spliced, and arc heating was performed in an air atmosphere. The electric discharge current was set to 13.1 mA, which was a minimum electric current. Arc heating was performed in the range of ±5 mm of the fusion-spliced point of the optical fibers A and B in the Z-axis direction. The splice loss measured after fusion splicing was 1.35±0.02 dB. On the other hand, the splice loss measured after arc heating was 0.6±0.12 dB.

As described above, it was confirmed that the splice loss was significantly reduced and the variation was also suppressed in Example 1 as compared with Comparative Example 1, since the splice loss after arc heating was 0.2±0.05 dB in Example 1 and the splice loss after arc heating was 0.6±0.12 dB in Comparative Example 1.

EXAMPLE 2

The optical fibers A and B were fusion-spliced, and arc heating was performed in an air atmosphere. The electric discharge current was alternately changed to 13.1 mA and 6 mA while arc heating was performed. The splice loss measured after fusion splicing was 1.35±0.02 dB. On the other hand, the splice loss measured after arc heating was 0.2 dB. The tensile breaking strength measured at n=20 was 4.3 kg on the average.

COMPARATIVE EXAMPLE 2

The optical fibers A and B were fusion-spliced, and arc heating was performed in an air atmosphere. The electric discharge current was set to vary in the range of 13 mA to 33 mA while arc heating was performed. The splice loss measured after fusion splicing was 1.35±0.02 dB. On the other hand, the splice loss measured after arc heating was 2.2 dB at an electric discharge current of 20 mA. Also, the splice loss tended to decrease and the width of the arc pillar tended to decrease as the electric discharge current decreased. Arc discharge was not stable at 13 mA or less. The tensile breaking strength measured at n=20 was 0.8 kg on the average.

As described above, in Example 2, the splice loss after arc heating was 0.2 dB, which was significantly reduced as compared with the splice loss of 2.2 dB after arc heating in Comparative Example 2. Also, it was confirmed in Example 2 that the loss could be reduced about 85% as compared with the splice loss of 1.35 dB measured before arc heating. The tensile breaking strength after arc heating became 4.3 kg on the average in Example 2, and hence heightened strength of the fusion spliced part was confirmed as compared with the average tensile breaking strength of 0.8 kg after arc heating in Comparative Example 2.

What is claimed is:

1. An optical fiber fusion splicing method, comprising:
   a process of fusion-splicing end faces of two optical fibers together to form a fusion spliced part; and
   a process of arc-heating the fusion spliced part continuously with one pair of electrodes while moving said one pair of electrodes at least in a longitudinal direction of the fiber, said one pair of electrodes being provided opposite to each other across the fusion spliced part, and said process of arc-heating being performed with an operation for decreasing arc temperature, wherein said operation for decreasing arc temperature is to add a modulation to an electric discharge current such that a maximum value becomes equal to or more than an electric current for starting arc discharge and a minimum value becomes more than zero and less than the electric current for starting arc discharge, wherein said modulation is achieved by a square wave whose frequency ranges from 10 Hz to 20 MHz.

2. An optical fiber fusion splicing method as set forth in claim 1, wherein
   said operation for decreasing arc temperature is achieved by flowing a gas having a molecular weight greater than an average molecular weight of air into a gas atmosphere in which arc heating is performed.

3. An optical fiber fusion splicing method as set forth in claim 2, wherein argon gas is used as said gas.

4. An optical fiber fusion splicing method as set forth in claim 3, wherein said argon gas has a flow rate in the range of 200–800 ml/min.

5. An optical fiber fusion splicing method as set forth in claim 1, wherein said modulation is made with a square wave whose duty ratio range is 1%–90%.

6. An arc heating unit for arc-heating a fusion spliced part of two optical fibers while moving at least in a longitudinal direction of said fibers one pair of electrodes provided opposite to each other across said fusion spliced part, comprising
   means for modulating the output of an arc discharge unit, wherein
   said arc heating being performed with the addition of a modulation for decreasing arc temperature to an electric discharge current such that a maximum value becomes equal to or more than an electric current for starting arc discharge and the a minimum value becomes more than zero and less than the electric current for starting arc discharge, wherein said modulation is achieved by a square wave whose frequency ranges from 10 Hz to 20 MHz.

* * * * *